United States Patent
Webster et al.

(10) Patent No.: US 6,945,616 B2
(45) Date of Patent: Sep. 20, 2005

(54) MODULAR ENCLOSURE SYSTEM FOR ELECTRONIC EQUIPMENT

(75) Inventors: James W. Webster, Bensenville, IL (US); Julius C. Lockhart, Chicago, IL (US)

(73) Assignee: Emerson Network Power, Energy Systems, North America, Inc., St. Louis, MO (US)

( * ) Notice: Subject to any disclaimer, the term of this patent is extended or adjusted under 35 U.S.C. 154(b) by 551 days.

(21) Appl. No.: 09/824,490

(22) Filed: Apr. 2, 2001

(65) Prior Publication Data

US 2002/0140325 A1 Oct. 3, 2002

(51) Int. Cl.$^7$ ............................................. A47G 29/00
(52) U.S. Cl. ............................... 312/265.3; 312/223.1; 312/265.4
(58) Field of Search .................. 312/107, 108, 312/111, 223.1, 265.1, 265.2, 265.3, 265.4, 296

(56) References Cited

U.S. PATENT DOCUMENTS

| | | | | |
|---|---|---|---|---|
| 4,544,069 A | * | 10/1985 | Cavallini | 211/183 |
| 5,020,866 A | * | 6/1991 | McIlwraith | 312/265.4 |
| 5,105,056 A | * | 4/1992 | Hoge et al. | 174/35 GC |
| 5,136,463 A | * | 8/1992 | Webster | 361/622 |
| 5,147,121 A | * | 9/1992 | McIlwraith | 312/296 |
| 5,388,903 A | * | 2/1995 | Jones et al. | 312/334.29 |
| 5,545,845 A | * | 8/1996 | Flores | 174/35 R |
| 6,164,369 A | * | 12/2000 | Stoller | 165/104.33 |
| 6,179,398 B1 | * | 1/2001 | Martin | 312/265.4 |
| 6,201,694 B1 | | 3/2001 | Turunen | |
| 6,657,861 B2 | * | 12/2003 | Irmer | 361/695 |

* cited by examiner

Primary Examiner—Janet M. Wilkens
(74) Attorney, Agent, or Firm—Harness, Dickey & Pierce, P.L.C.

(57) ABSTRACT

A modular enclosure system for electronic equipment is disclosed as is a process for assembling such a system. The basic element of the system is a frame unit which forms a chamber of the electronic equipment. Each frame unit has front, rear and side openings. Around each opening is a flange and a push-on bulb seal. A generally rectangular cross-sectioned seal is adhered to corner posts of the frame unit. Doors are mounted to the frame unit to seal the front and rear openings by compressing respective bulb seals. Side panels are mounted to the frame unit to cover side openings of a single or multi-frame unit system and the side panel compress both types of seals mentioned above. Bridge panels connect adjoining, alinged frame units and compress the rectangular seals and also result in bulb seals mounted around adjoining side openings of adjoining frame units to compress each other. Battery housings, covers and skids are also connected to aligned frame units as is a single cap panel. The system is simple, economical, easy to handle, east to install and easy to expand.

12 Claims, 7 Drawing Sheets

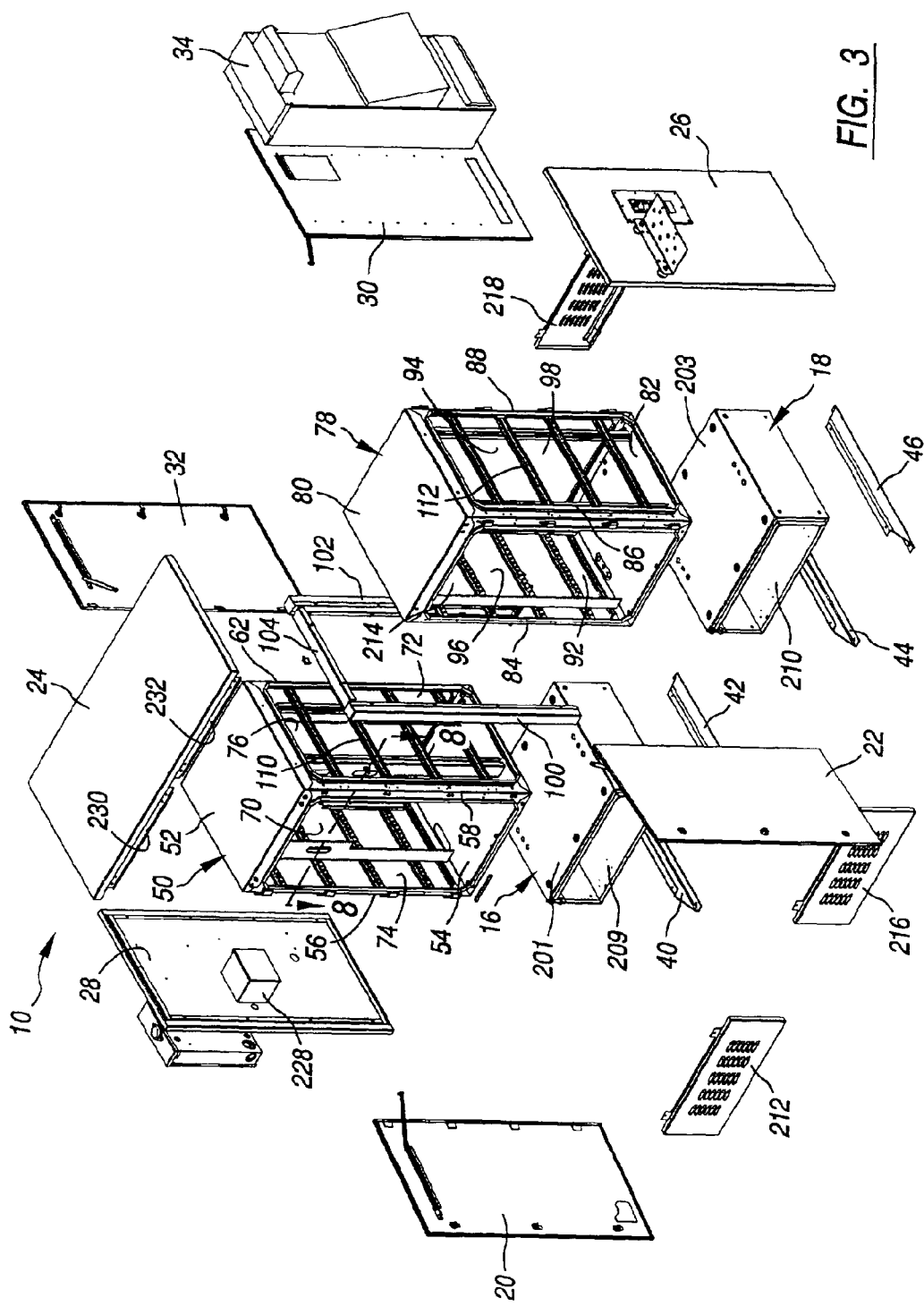

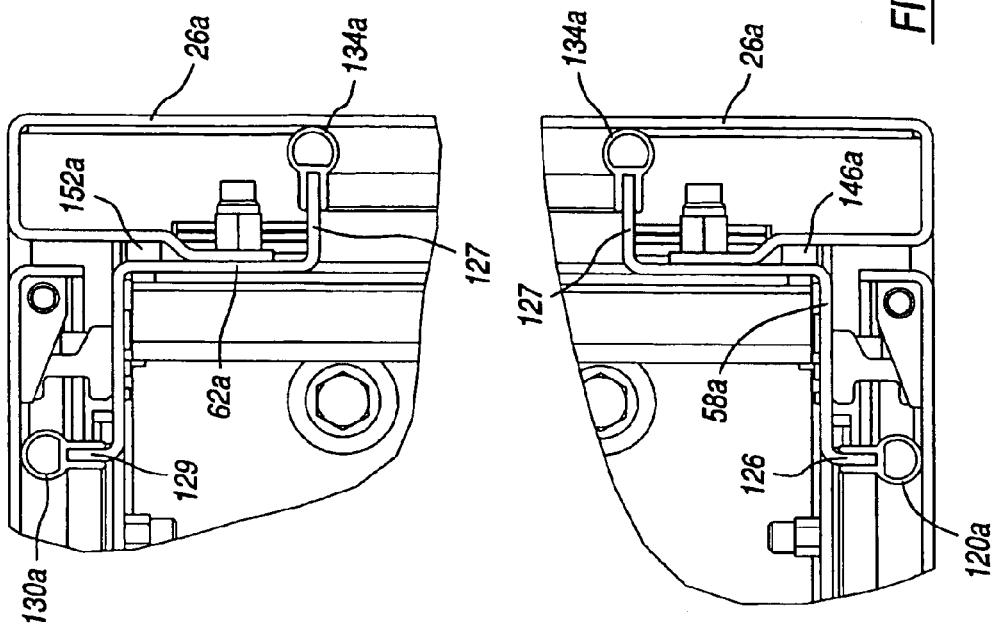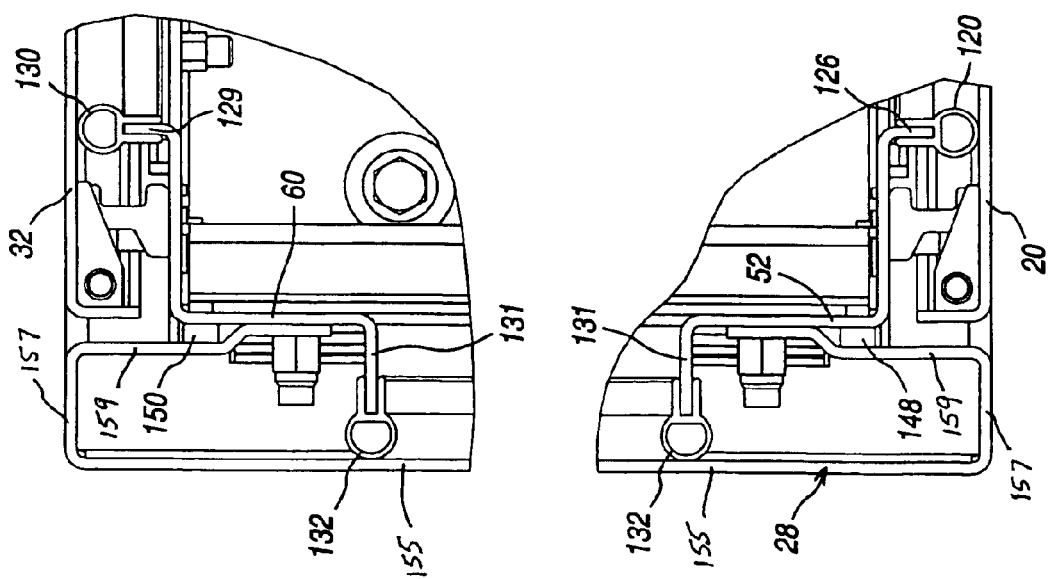
FIG. 8

MODULAR ENCLOSURE SYSTEM FOR ELECTRONIC EQUIPMENT

BACKGROUND OF THE INVENTION

CROSS REFERENCE TO RELATED APPLICATIONS

Not applicable.

STATEMENT REGARDING FEDERALLY SPONSORED RESEARCH

Not applicable.

1. Field of the Invention

The present invention relates to a modular enclosure system for electronic equipment and more particularly to a modular equipment enclosure system which allows for ease of handling, installation and on-site expansion.

2. Description of the Related Art

Equipment enclosures are used to house sensitive electronic equipment associated with voice, data and/or video transmission. These enclosures protect the equipment against the environment as well as from tampering and vandalism. Equipment enclosures are often placed out of doors on grounded concrete pads, on rooftops, attached to billboards or poles or within mechanical rooms. Because of their size and weight, a crane is usually required to complete installation, and expansion of enclosure space often requires a new larger enclosure or an additional new enclosure. Replacing enclosures or requiring additional ones is expensive and time consuming and may require interruption of the service performed by the electronic equipment. These difficulties are, of course, undesirable. Module enclosures have been proposed, such as that disclosed in U.S. Pat. No. 6,201,694, but these have been found wanting.

BRIEF SUMMARY OF THE INVENTION

The difficulties encountered with previous enclosures have been overcome by the present invention. What is described here is a modular electronic equipment enclosure system comprising a frame unit having front, rear, left side, right side, top and bottom portions and front, rear and side openings, a flange bordering each of the openings, a first type of seal mounted to each of the flanges, a second type of seal mounted to the sides of the frame unit, side panels for mounting to the left and right side portions of the frame unit and for compressing both the first type and the second type of seals when the side panels are attached to the frame unit, and door panels for mounting to the front and the rear portions of the frame unit for compressing the first type of seal when the door panels are attached to the frame unit. The system includes a bridge panel connected to the left and the right side portions of adjoining frame units when two frame units are connected to each other, the bridge panel for compressing the second type of seal when the bridge panel is connected to the two frame units. A method for forming the enclosure system is also disclosed.

There are a number of advantages, features and object achieved with the present invention which are believed not to be available in earlier related devices. For example, one advantage is that the present invention provides a modular system that allows each module to be handled by a single technician using a standard two-wheel hand dolly. The services of a crane are not required. Another object of the present invention is to provide a modular enclosure system that can be assembled and expanded at a site and without requiring the use of adhesives or sealants. A further advantage is that the doors, side panels and other parts of the enclosure can be changed or replaced without disconnection of any of the electronics protected by the enclosure or without interruption of the services provided by the electronics. Thus, the integrity of the system is maintained. Another feature of the present invention is to provide a modular enclosure system that is simple, reliable and relatively inexpensive. A further advantage of the present invention is to provide a modular enclosure system that substantially reduces installation costs. The system can easily pass through standard thirty-six inch doorways, down hallways and up stairs for rooftop applications. Yet another aim of the present invention is to provide a modular enclosure system that may be bolted together and sealed without damaging the gaskets used and without the need for caulking material, and when completed, the doors and panels are mounted flush providing for an attractive appearance. All hardware is assembled to industry standard torque requirements and yet no damage is done to any of the seals. This allows easy reassembly and assurance of environmental integrity.

A more complete understanding of the present invention and other objects, advantages and features thereof will be gained from a consideration of the following description of the preferred embodiments read in conjunction with the accompanying drawing provided herein.

BRIEF DESCRIPTION OF THE SEVERAL VIEWS OF THE DRAWING

FIG. 3 is an exploded front isometric view of the modular enclosure system shown in FIGS. 1 and 2.

FIG. 8 is a partial, broken away, sectional plan view taken generally along the line 8—8 of FIG. 3 but showing four vertical corner posts and related elements modified to illustrate a single frame unit having left and right side panels.

DETAILED DESCRIPTION OF A PREFERRED EMBODIMENT OF THE INVENTION

Figure 1:
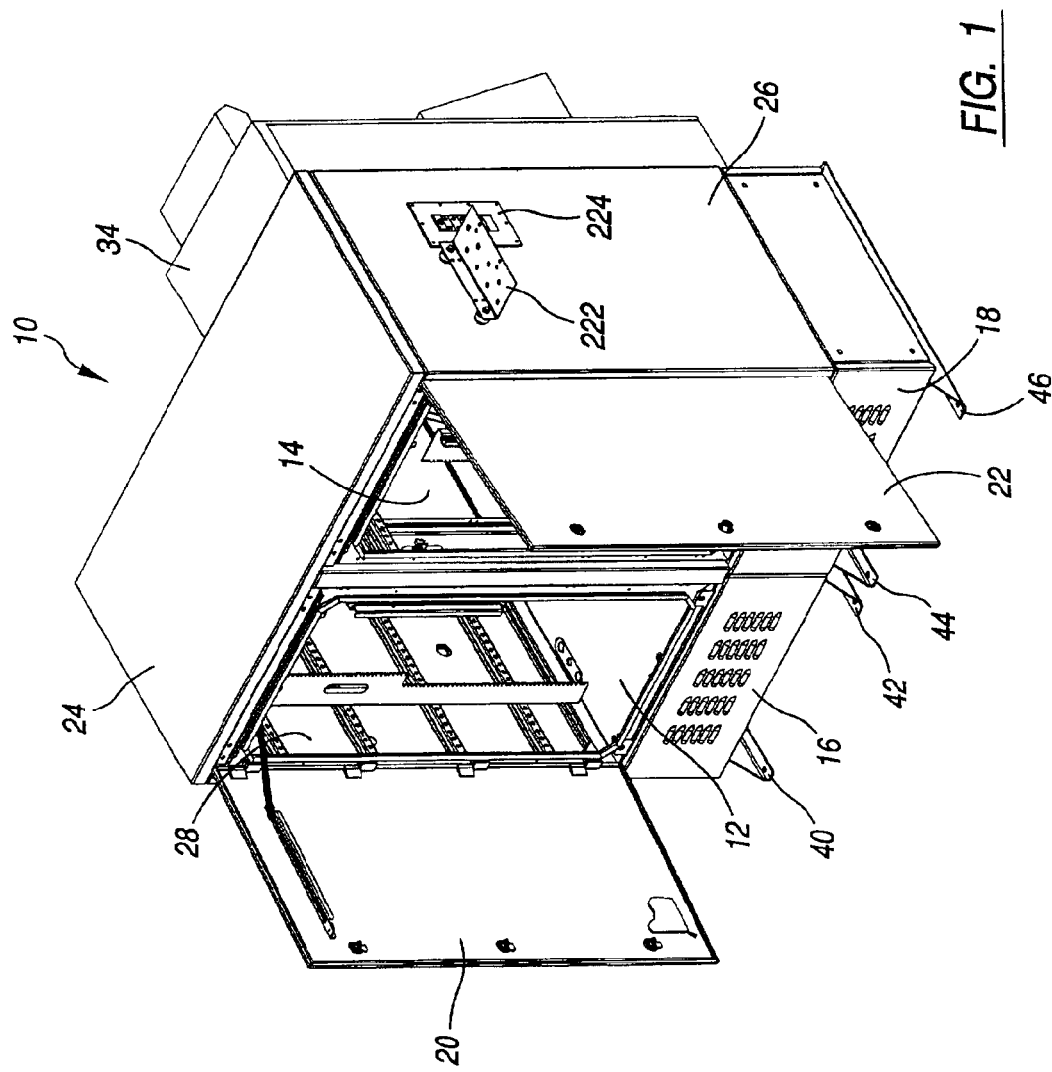
FIG. 1 is a front isometric view illustrating two segments of the modular enclosure system with open front doors.

While the present invention is open to various modifications and alternative constructions, the preferred embodiments shown in the drawing will be described herein in detail. It is understood, however, that there is no intention to limit the invention to the particular forms disclosed. On the contrary, the intention is to cover all modifications, equivalent structures and methods, and alternative constructions falling within the spirit and scope of the invention as expressed in the appended claims.

Figure 2:
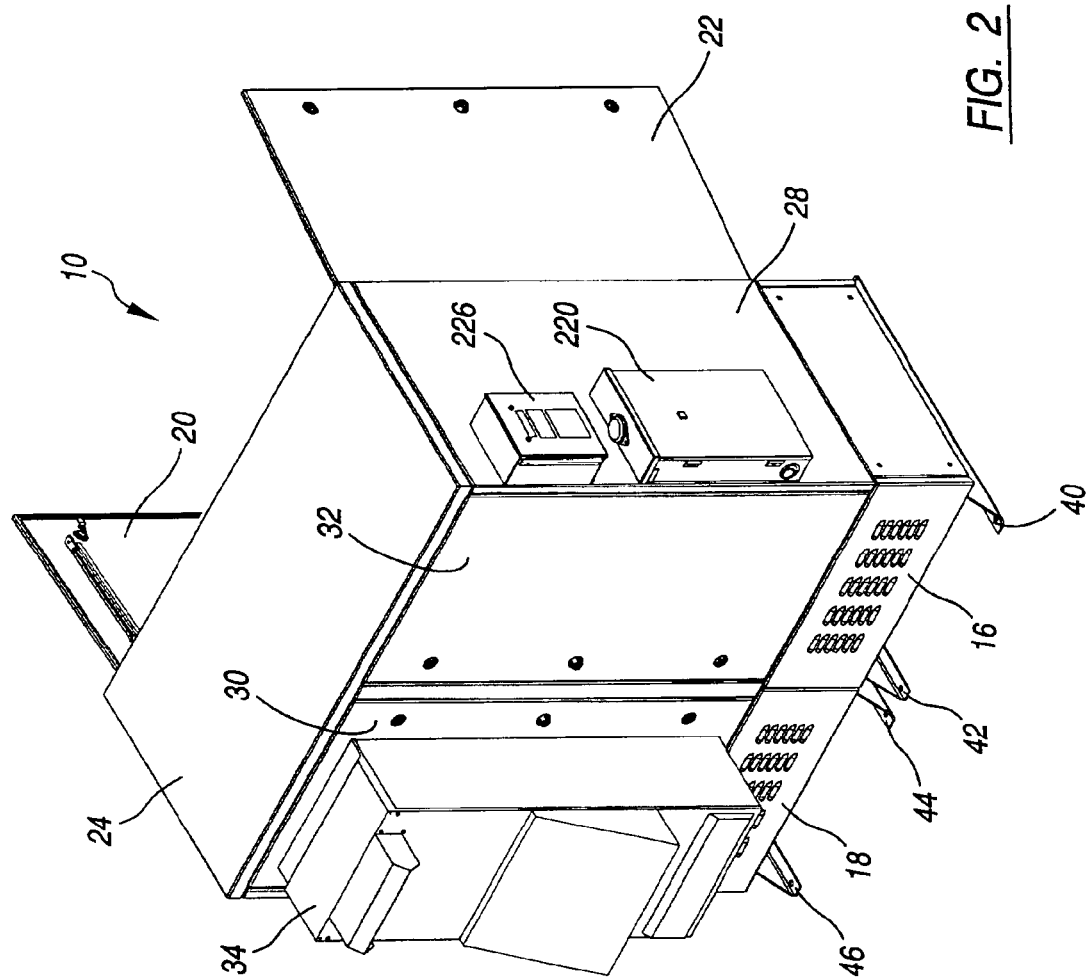
FIG. 2 is a rear isometric view of the modular enclosure system shown in FIG. 1.
Figure 5:
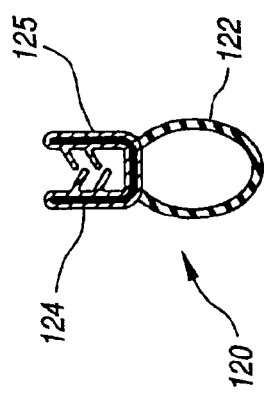
FIG. 5 is an enlarged sectional view of a push on bulb seal.

The simplicity and relative inexpensiveness of the inventive modular equipment enclosure system may be seen by reference to FIGS. 1 and 2. There is shown a modular equipment enclosure system 10 of the present invention configures with two modules or segments. The enclosure system 10 includes two chambers 12, 14 for electronic components situated side-by-side, and placed over two side-by-side battery compartments 16, 18. A pair of open front doors 20, 22 are provided to help seal the chambers, and spanning the two chambers is a continuous roof cap or panel 24. To each side of the chambers is a side panel 26, 28. Also included are two rear doors 30, 32. An air conditioning system 34 for thermal management is attached to the rear door 30. A pair of skids support each module, such as the first pair of skids 40, 42 for the left side module and the second pair of skids 44, 46 for the right side module.

Figure 4:
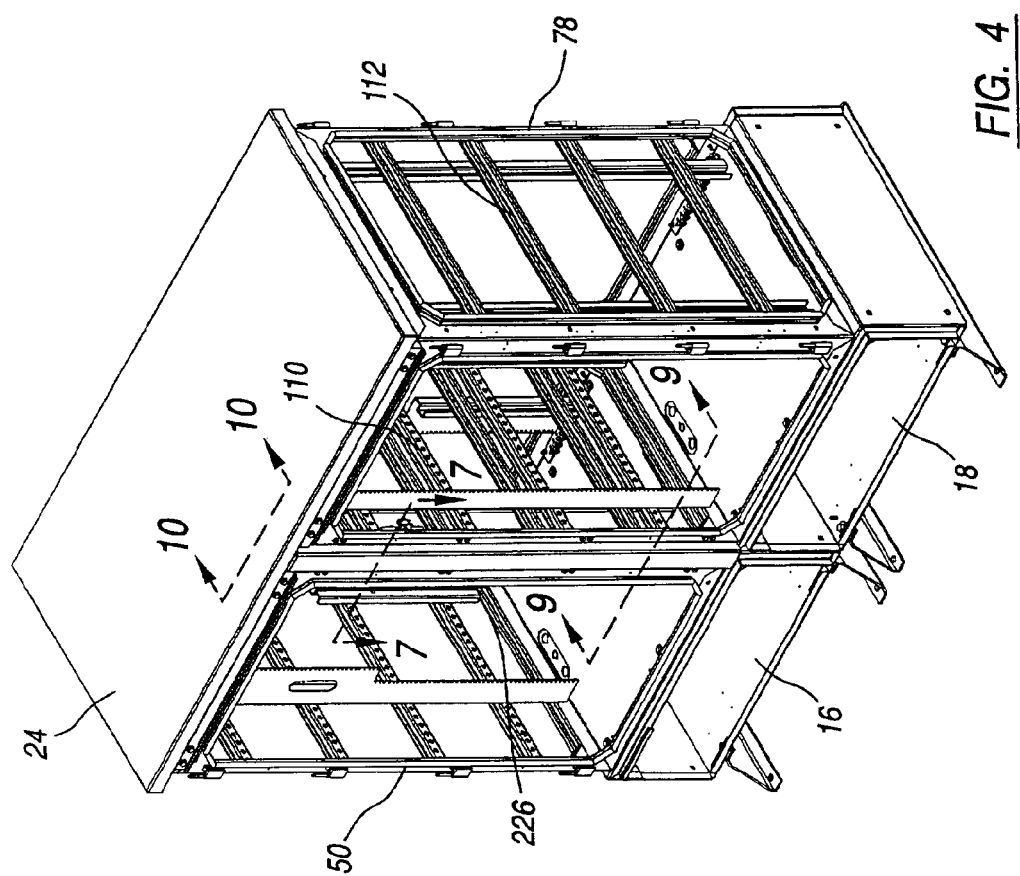
FIG. 4 is a front isometric view of the modular enclosure system shown in FIGS. 1–3 but without side panels and doors.

The various parts of the two segment modular enclosure system 10 are shown in more detail in FIGS. 3 and 4. The skeleton of a segment or module is a frame unit 50 having a top portion or wall 52 and a bottom portion or wall 54. Between the top wall and the bottom wall are four vertical corner posts, two front corner posts 56, 58 and two rear corner posts 60, 62. (Rear corner post 60 is shown in FIG. 8.) The corner posts form the front, rear and side portions of the frame unit. The top wall 52 and bottom wall 54 are secured to the four vertical corner posts such as by welding. The frame unit has a front opening 70 and a rear opening 72. There are also a left side opening 74 and a right side opening 76. The corner posts and top and bottom walls frame the front, rear and side openings, and the frame unit establishes the chamber for housing electronic equipment. To protect the equipment each of the openings are sealed against the environment and against tampering. The doors cover the front and rear openings and the side panels cover the side openings unless multiple frame units are aligned and attached to one another. In that case the adjoining side openings allow communication between chambers. The seal around each side opening abuts each other to close off the side openings as will be explained below.

Figure 7:
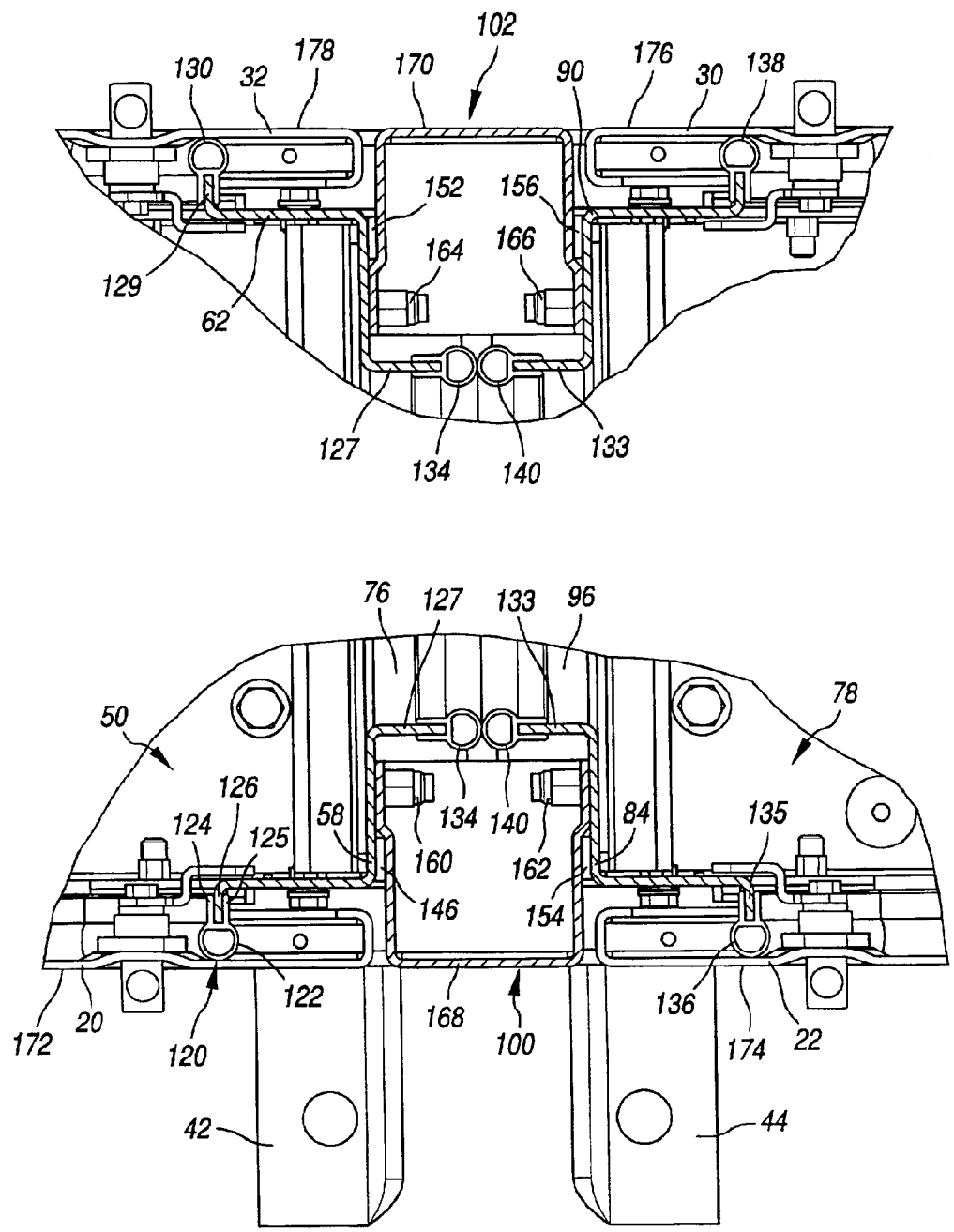
FIG. 7 is a partial, broken away, sectional plan view taken along the line 7—7 of FIG. 4.

A second frame unit 78 is also shown and includes a top wall 80, a bottom wall 82 and four vertical corner posts 84, 86, 88 and 90. (The corner post 90 is shown in FIG. 7.) The second frame unit 78 also includes a front opening 92, a rear opening 94, a left side opening 96 and a right side opening 98.

To facilitate attachment of the two frame units 50, 78 (and any additional frame units that may be needed), there is a front bridge panel 100, a rear bridge panel 102 and a top structural panel 104. The front and rear bridge panels are dimensioned to align flush with the doors so as to enhance the appearance of the completed enclosure. For every additional frame unit, additional front and rear bridge panels and a structural panel are needed. Each frame unit includes a plurality of horizontally disposed brackets extending from the two front corner posts of each frame unit to the two rear corner posts, such as the bracket 110 of the frame unit 50 and the bracket 112 of the frame unit 78.

A major advantage of the present invention is that the size of the frame unit allows for easy handling, transport and installation when compared to large size integral enclosures which are heavy and bulky. The large size enclosures typically require the services of a crane for installation thereby resulting in substantial costs. The modular enclosure system of the present invention obviates the need for a crane because of the smaller, much more manageable size modules or segments beginning with a frame unit. A segment, even when loaded with electronic equipment, can be passed through a standard thirty-six inch door, moved down a hallway and carried up stairs for rooftop installations. Another important advantage is that the enclosure system 10 may be easily expanded when the need arises because the expansion, in the form of additional frame units and related elements, may be assembled on site quickly and economically. Further, panel parts may be added or exchanged easily. All of this may be accomplished without disconnection of the electronic equipment housed within the enclosure system. Because of the structure of the present invention, the enclosure may be assembled, disassembled and reassembled.

To achieve a completely constructed enclosure system, it is essential that the electronic equipment chamber be sealed environmentally against seventy mph wind driven rain, salt fog, humidity, bugs and the like. This sealing must exist between frame units, between a frame unit and a set of doors and between a frame unit and a set of side panels. A major feature of the present invention is that each frame unit includes two sets of factory installed seals, and that these seals may act as primary or secondary seals as will be explained below. It is to be noted that caulking and liquid sealant are not required for assembly or for later expansion. The enclosure system can also be taken apart and reassembled and still maintain seal integrity.

Referring now to FIGS. 5–8, there is illustrated a first type of seal 120 disposed along the front corner post 58, but extending around the front opening 70 of the first frame unit 50. The seal 120, sometimes referred to as a "push-on bulb seal" is an elongated extrusion having an outer tubular portion 122 and a mounting portion of two parallel arms 124, 125. Around the front opening 70 is a flange 126. Similar flanges 127, 129, 131 are formed around all of the openings as are shown and identified. The seal 120 is compression fitted or mounted to the flange in a manner well known to those skilled in the art. The first type of seal functions by having either another seal or a panel compress the tubular portion 122 so as to close off the region beyond the seal to moisture, dust and the like. An identical seal 130 surrounds the rear opening 72. Further, identical seals 132, 134 surround the left side and right side openings 74, 76 respectively. Additional identical seals 136, 138 and 140 surround the front, rear and left side openings 92, 94, 96, respectively, of the frame unit 78. Another identical seal surrounds the right side opening 98 of the frame unit 98 but is not shown in FIG. 7.

Figure 6:
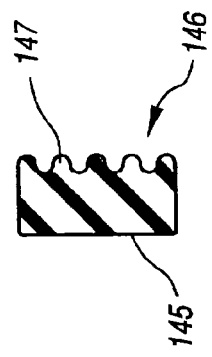
FIG. 6 is an enlarged sectional view of a pressure sensitive seal.

A second type of seal or gasket 146, FIG. 6, is mounted vertically along the side of the front corner post 58. The second type of seal has a generally rectangular cross section with an adhesive on one surface 145 and ribs 147 on the opposite surface. The adhesive allows the seal to be pressure sensitive and thereby applied to the frame units with ease. Identical seals 148, 150, 152 are applied in the same manner to the corner posts 56, 60, 62, respectively. Identical seals 146a, 152a are applied to the corner posts 58a, 62a, respectively. Identical seals 154, 156 are also applied to corner posts 84, 90 of the frame unit 78. Further identical seals are mounted horizontally about the side openings 74, 98. Of course, the first and second type seals are applied identically to all corresponding features of the frame unit 78. The designation "a" is used on the right side of FIG. 8 because a modified embodiment is illustrated. Instead of the frame unit 50 being connected to the frame unit 78 as is shown in FIGS. 1, 2, 7, 9, 10, the right side opening 76 is closed by a side panel 26a as it would be if only one module was being used. As can now be appreciated, the side panel 26a can be easily removed and a second frame unit may be connected.

The side panels, such as the side panel 28, are all structured to include a central portion 155, FIG. 8, an integral edge portion 157 formed about ninety degrees away from the central portion and an integral peripheral border portion 159 formed about ninety degrees away from the edge portion so that the peripheral border portion 159 is generally parallel to the central portion 155.

As can be seen in FIG. 8, only the central portion 155 of the side panel 28 bears against and compresses the first type bulb seal, such as the seal 132, and only the peripheral border portion 159 of the side panel 28 bears against and compresses the second type rectangular seal, such as the seals 148, 150. The central portion 155 does not contact the second type rectangular seals and the peripheral border portion 159 does not contact the first type bulb seals.

The first type seals 120, 136 and the second type seals 146, 154 are primary seals while the first type seals 134, 140 are secondary seals. In a like manner, the seals 120, 130, 148, 150 are primary seals and the seal 132 is a secondary seal.

The seals are available from vendors and may be acquired from Schlegel Corp. of Rochester, N.Y.

The front bridge panel 100 and the rear bridge panel 102 connect the two frame units 50, 78 together in a manner that also compresses the two seals 134, 140. Each of the bridge panels are connected to their respective vertical corner posts by fasteners, such as the two fasteners 160, 162 near the front of the enclosure system and the two fasteners 164, 166 near the rear of the enclosure system. As can be seen, a front wall 168 of the front bridge panel 100 and a front wall 170 of the rear bridge panel 102 align flush with the outer surfaces 172, 173 of the front doors 20, 22, respectively, and the outer surfaces 176, 178 of the rear doors 30, 32, respectively. The flush aligned look of the enclosure system enhances its aesthetic appeal.

Figure 10:
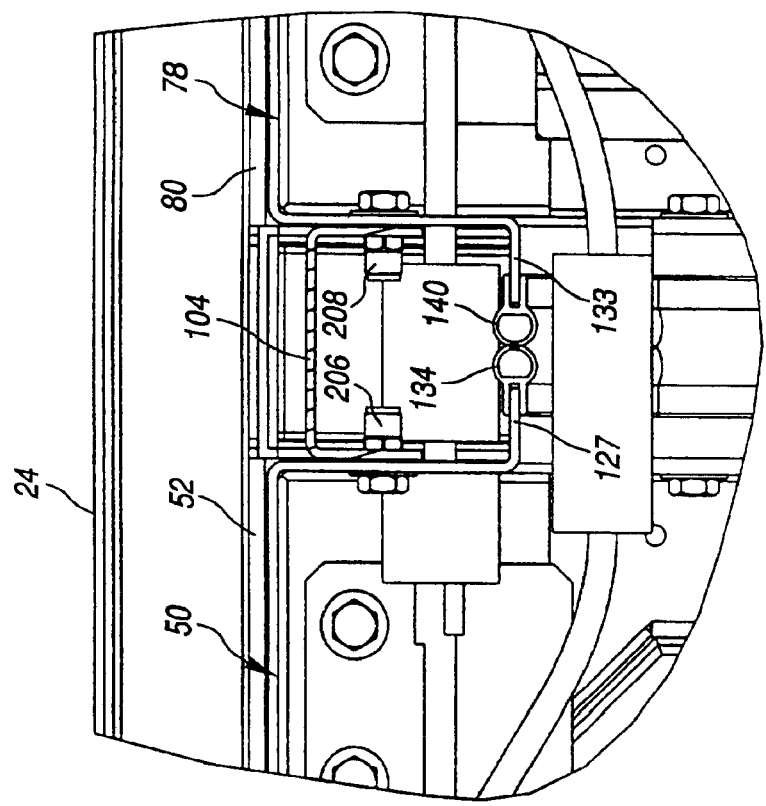
FIG. 10 is a partial, sectional elevation view taken along the line 10—10 of FIG. 4.
Figure 9:
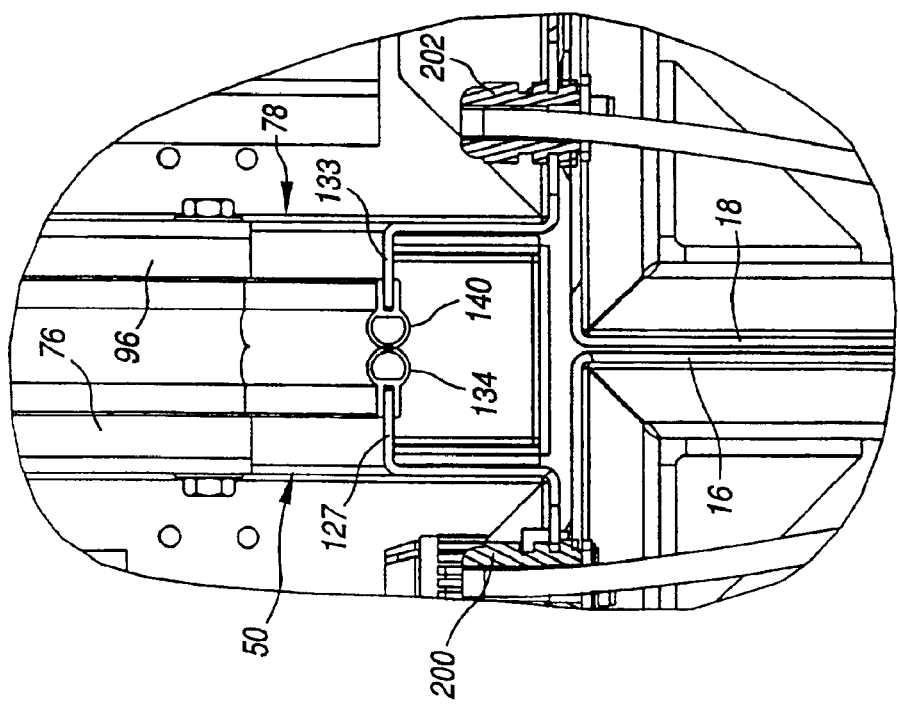
FIG. 9 is a partial, sectional elevation view taken along the line 9—9 of FIG. 4.

As shown in FIG. 7 and also in FIGS. 9 and 10 when two cage frames are joined together, the seals make abutting contact such that the adjoining left and right side openings, such as the openings 76, 96, are entirely sealed or closed off. The front and rear seals 120, 130 are engaged by the doors 20, 32, respectively, and these compress the seals when the doors are closed. In the case of the side seals 132, 134 and the seals 146, 146a, 148, 150, 152, 152a, they are compressed by side panels 26a, 28 as shown in FIG. 8, the front and back bridge panels 100, 102 and by the side seal 140 as shown in FIG. 7.

Using industry standard torque requirements, fasteners, such as the fasteners 200, 202 may be used to attach the frame units 50, 78 to the battery compartments 16, 18, respectively. Referring back to FIG. 10, there is illustrated the upper portion of the attached frame units 50, 78 and the two seals 134, 140, the seal 134 being part of the frame unit 50 and the seal 140 being part of the frame unit 78. When the frame units are connected, the two seals compress one another. The top bridge panel 104 is arranged to cover the upper portions of the seals 134, 140 and is attached to the two frame units 50, 78 by fasteners 206, 208. The fasteners 200, 202, 206, 208 may be sealed head insert types available from vendors, such as AVK Industrial Products, a division of AVI Bank Mfg. Inc. of Valencia, Calif.

The advantage of the seals described here is that there is no need to apply caulking or liquid sealant to the frame units, to the panels or to the doors to ensure sealing worthiness and integrity. The seals disclosed here make installation, expansion and part replacement easy and quick as well as consistent. The chance of inconsistent sealing is much less with factory installed seals when compared to the field application of caulking or sealant. Also, assembly is quick and easy using industry standard tools and torques. Forming the various elements of the system uses standard metal forming tools and processes and assembly is well known by those skilled in the art.

Another important feature of the present invention is that the various parts are designed to limit the compression forces on the seals so as not to permanently distort them. Because of this feature, the enclosure may be assembled, disassembled, expanded and reassembled numerous times. For example, to accommodate the rectangular seals 146, 152, 154, 156, which are about one-quarter inch thick, the front and rear bridge panels 100, 102 are set back about one-eighth of an inch as shown in FIG. 7 so that when attached, the seal will only be compressed about half of its thickness, well within its elastic limit. In a like manner, the dimensions of the bulb seals, the bridge panels and the flanges are designed to safely compress the bulb seals without permanent distortion and without seal failure. Because the seals are protected, another important feature of the present invention is derived. The enclosures disclosed above are sealant and caulking free because the first and second types of seals are effective even after long term use or use after the seals have been compressed, released and compressed again. Caulking and sealants may seal but they are not "reuseable". If such a seal is broken because of disassembly, it is no longer effective.

The battery compartments 16, 18 are formed by housings 201, 203 and include enclosed shelves 209, 210. Front and back covers 212, 214, 216 and 218, FIG. 3, complete formation of the compartments. To prevent tampering, the covers cannot be removed unless the doors are opened. The shelves may be about 34.25 inches long, 34.13 inches wide and 14.29 inches high. The battery chamber may be about 33.75 inches by 31.5 inches by 13.75 inches. Each frame unit is about 34.25 inches long, 34.13 inches wide and 57.75 inches high. The doors are each about 31 inches wide and 57.75 inches high. The wall thickness for most of the panels, the doors and the frame units is about 0.125 inches.

Mounted on the side panel 28 is a load center 220, FIG. 2, and mounted to the side panel 26 is an RF ground plate 222, FIG. 1. Also mounted on the side panel 26 is a cover plate 224 to close an opening for RF cables. If desired, a surge suppressor 226 may be mounted to the side panel 28 above the load center 220. Inside the frame unit is a consolidated receptacle box 228, FIG. 3, to power all 120/240 volt AC equipment mounted in the frame unit 50 and in all adjoining frame units. This feature allows easy field assembly and disassembly of the system thereby eliminating costs connected with adding conduit, wire and circuits.

Yet another feature may be seen by reference to FIG. 3. The roof cap 24 may be formed with rain gutters 230, 232 in the form of "J" shaped elements. Similar elements may be formed on the opposite side. The rain gutters direct rain water away from the front and rear openings of the frame units.

The various parts of the enclosure are best seen in FIG. 3. The manufacture of these parts is relatively inexpensive because every frame unit, door, side panel, battery compartment housing and battery compartment cover are identical to every other part of the same description. An enclosure system may include one frame unit or a multiple number of frame units. Each frame unit is designed to be handled by a single person using a standard two wheel, hand operated dolly. Electronic equipment may also be installed in each frame unit of a multi-segment enclosure system at the factory. The equipment will be connected to community power at the site. If more than one frame unit is used to construct a particular enclosure system, each of the frame units may be limited in the amount of weight that it carries so as to assist in the ease of handling and installation. Further, other modular pieces, such as thermal management systems may be easily bolted on to the enclosure system and may be moved or upgraded to accommodate system growth. As a subassembly, the door with the thermal management system can be removed by simply lifting the door off its hinges without the use of any tools.

All modular systems now existing require the application of caulking of sealant which is time consuming and expensive as well as problem prone because such caulking or sealant is never completely uniform. Also, caulking and sealants are one time seals. The present enclosure system eliminates caulking and sealant and requires nothing more than standard tools and torques both, for initial assembly or for expansion. The modular system of the present invention allows easy field assembly and disassembly thereby eliminating much of the costs usually affiliated with installation and the addition of conduit, wire and circuits. The doors are interchangeable and may be either left hand or right hand opening simply by manipulating the door one hundred eighty degrees before assembly.

The specification describes in detail an embodiment of the present invention. Other modifications and variations will, under the doctrine of equivalents, come within the scope of the appended claims. For example, different dimensions, opening geometries and sealing designs are considered equivalent structures. Using one module or more than two modules are equivalent systems. Thermal management devices may include air conditioning systems, heat exchangers or fans or any combination of these. Further, the thermal management device may be attached to the doors or the side panels, or mounted above a frame unit or beneath. Still other alternatives will also be equivalent as will many new technologies. There is no desire or intention here to limit in any way the application the doctrine of equivalents.

What is claimed is:

1. A modular enclosure system for electronic equipment comprising:
   a frame unit having front, rear, left side, right side, top and bottom portions and front, rear and side openings;
   a flange bordering each of said openings;
   a first type of seal mounted to each of the flanges;
   a second type of seal mounted to said side portions of said frame unit;
   side panels for mounting to said left and said right side portions of said frame unit, for covering said side openings and for compressing both said first type and said second type of seals when said side panels are attached to said frame unit;
   door panels for mounting to said front and said rear portions of said frame unit, for covering said front and rear openings and for compressing said first type of seal when said door panels are attached to said frame unit; and
   a bridge panel connected to said left and said right side portions of aligned framed units when two frame units are connected to each other, said bridge panel for compressing said second type of seal when said bridge panel is connected to said two frame units.

2. The modular enclosure system of claim 1 wherein:
   said bridge panel is generally channel shaped having two arm portions and a base portion; and
   each of said arm portions compress said second type of seal when said bridge panel is connected to adjoining frame units.

3. The modular enclosure system of claim 1 wherein:
   said bridge panel includes an outer surface aligned generally flush with outer surfaces of said door panels when connected to adjoining frame units.

4. The modular enclosure system of claim 1 wherein:
   each of said side panels includes an integral peripheral border for bearing against said second type of seal; and
   each of said door panels includes a portion for contacting and compressing said first type of seal.

5. The modular enclosure system of claim 4 wherein:
   said bridge panel is generally channel shaped having two arm portions and a base portion;
   each of said arm portions compress said second type of seal when said bridge panel is connected to adjoining frame units; and
   said bridge panel includes an outer surface aligned generally flush with outer surfaces of said door panels when said bridge panel and said door panels are connected to said frame units.

6. The modular enclosure system of claim 5 wherein:
   said first type of seal includes a tubular portion and a mounting portion;
   said mounting portion engages said flange when said first type of seal is mounted to said flange; and
   said second type of seal is an elongated strip having a rectangular cross section and an adhesive layer on one surface.

7. The modular enclosure system of claim 6 wherein:
   said frame unit forms a chamber for mounting electronic equipment.

8. The modular enclosure system of claim 7 including:
   a battery housing connected to said frame unit;
   a pair of skids connected to said battery housing; and
   a cap panel connected to said top portion of said frame unit.

9. A process for assembling an electronic equipment enclosure system comprising:
   forming a frame unit having front, rear, left side, right side, top and bottom portions and front, rear and side openings;
   mounting a first type of seal around said front, rear and side openings;
   mounting a second type of seal along vertical surfaces of said frame unit; providing a side panel;
   connecting said side panel to said frame unit for covering one of said side openings in said frame unit and for compressing both said first type of seal and said second type of seal;
   providing a door; and
   connecting said door to said frame unit for covering the front opening in said frame unit;
   providing a bridge panel; and
   connecting said bridge panel to two aligned frame units.

10. The process for assembling an electronic equipment enclosure system of claim 9 including the steps of:
    providing a battery housing;
    connecting said battery housing to at least one of said frame units;
    providing a cap panel; and
    connecting said cap panel to said frame unit.

11. The process for assembling an electronic equipment enclosure system of claim 10 wherein:
said first type of seal includes a tubular portion; and
said second type of seal is an elongated strip having a generally rectangular cross section; and
including the steps of compressing said first type of seal when said door is closed over said front opening; and
compressing said second type of seal when said bridge panel is connected to said two aligned frame units.

12. A process for assembling an electronic equipment enclosure system comprising:
forming a frame unit having front, rear, left side, right side, top and bottom portions and front, rear and side openings;
mounting a first type of seal around said front, rear and side openings;
mounting a second type of seal along vertical surfaces of said frame unit; providing a side panel wherein said side panel being structured to have a central portion, an integral edge portion formed about ninety degrees away from said central portion and an integral border portion formed about ninety degrees away from said edge portion wherein said integral peripheral border portion is generally parallel to said central portion;
connecting said side panel to said frame unit for covering one of said side openings in said frame unit and for compressing both said first type of seal and said second type of seal, wherein said peripheral border portion compresses said second type of seal and not said first type of seal and said central portion compresses said first type of seal and not said second type of seal;
providing a door; and
connecting said door to said frame unit for covering the front opening in said frame unit.

* * * * *